(12) United States Patent
Glover et al.

(10) Patent No.: US 7,533,230 B2
(45) Date of Patent: May 12, 2009

(54) TRANSPARENT MIGRATION OF FILES AMONG VARIOUS TYPES OF STORAGE VOLUMES BASED ON FILE ACCESS PROPERTIES

(75) Inventors: Frederick S. Glover, Hollis, NH (US); Timothy Mark, Goffstown, NH (US); Doug Williams, Harvard, MA (US)

(73) Assignee: Hewlett-Packard Developmetn Company, L.P., Houston, TX (US)

( * ) Notice: Subject to any disclaimer, the term of this patent is extended or adjusted under 35 U.S.C. 154(b) by 518 days.

(21) Appl. No.: 10/964,835

(22) Filed: Oct. 13, 2004

(65) Prior Publication Data

US 2006/0080365 A1    Apr. 13, 2006

(51) Int. Cl.
*G06F 12/00* (2006.01)
*G06F 17/30* (2006.01)
*G06F 7/00* (2006.01)

(52) U.S. Cl. .......................................... 711/165; 707/6
(58) Field of Classification Search ................. 711/165; 707/6
See application file for complete search history.

(56) References Cited

U.S. PATENT DOCUMENTS

| | | | |
|---|---|---|---|
| 5,659,743 A | 8/1997 | Adams et al. | |
| 5,734,916 A | 3/1998 | Greenfield et al. | |
| 6,035,306 A | 3/2000 | Lowenthal et al. | |
| 6,751,637 B1 | 6/2004 | Hitz et al. | |
| 6,779,078 B2 * | 8/2004 | Murotani et al. | 711/112 |
| 6,904,599 B1 * | 6/2005 | Cabrera et al. | 719/328 |
| 7,096,336 B2 * | 8/2006 | Furuhashi et al. | 711/165 |
| 2003/0093439 A1 | 5/2003 | Mogi et al. | |
| 2004/0153479 A1 | 8/2004 | Mikesell et al. | |
| 2005/0114608 A1 * | 5/2005 | Oshima et al. | 711/137 |
| 2006/0143419 A1 * | 6/2006 | Tulyani | 711/165 |

FOREIGN PATENT DOCUMENTS

| | | |
|---|---|---|
| EP | 1462927 | 3/2004 |
| JP | A-9-274544 | 10/1997 |
| JP | A-2001-067187 | 3/2001 |

* cited by examiner

*Primary Examiner*—Reginald G. Bragdon
*Assistant Examiner*—Mehdi Namazi

(57) ABSTRACT

In one embodiment, a method and system for storing a file in a storage domain is provided. The method includes monitoring access to a file to determine a file access pattern, tagging the file to indicate the identified access pattern and using the tag to identify an appropriate storage medium in a storage domain for the file, when available, based on the access pattern.

27 Claims, 3 Drawing Sheets

TRANSPARENT MIGRATION OF FILES AMONG VARIOUS TYPES OF STORAGE VOLUMES BASED ON FILE ACCESS PROPERTIES

BACKGROUND INFORMATION

Modern information systems store data in a variety of types of storage volumes or storage devices. Each of the types of storage volumes offers its own storage characteristics. For example, some storage volumes operate at higher speeds by, for example, providing a data cache to store frequently accessed data. Other storage volumes are slower but omit costly components like a data cache and are thus more economical. Many other factors differentiate the variety of storage volumes available on the market today, e.g., capacity, back-up capability, portability, interface, operational modes, reliability, RAID properties, performance, etc.

System designers or administrators typically choose the storage volumes for a particular system based on the anticipated needs of the system. Some systems use a single storage volume while other systems deploy with virtual disks comprised of multiple storage volumes in a storage array. Either way, the system designer conventionally selects the storage system solution based on the anticipated applications to be run on the system. When more than one storage volume is used, the system designer determines the storage system that is used to store data files for each application. This binding of files to storage volumes is typically static and is only changed by manual intervention of the system designer or administrator.

Applications can be configured to store their data on a variety of different storage solutions, but as a result may not be optimally matched for operational efficiency and performance. Occasionally, an application works well with an initial storage configuration, but, over time, the application begins to experience performance problems with the use of the storage configuration. Thus, system administrators monitor the operation of an application to determine if there is a performance or operational problem caused by the storage configuration used to store data for the application. If a problem is identified, the administrator intervenes by binding the data file to another type of storage volume. This can be a time consuming and costly operation to identify the source of a simple mismatch between the data file and the storage volume, and may require bringing the application offline while the rebinding operation is completed, impacting the overall system availability and likely the Service Level Agreement between the service provider and consumer.

SUMMARY

Embodiments of the present invention provide transparent migration of files among various types of storage volumes in a storage domain based on file access properties.

In one embodiment, a method for dynamically migrating files in a storage domain transparent to any applications currently using the file is provided. The method includes periodically checking a tag in a file stored on one of a plurality of storage volumes in the storage domain, wherein the tag identifies a pattern of prior access to the file, determining whether the access pattern matches a storage classification for the one of the plurality of storage volumes on which the file is stored and when the access pattern does not match the storage classification for the one of the plurality of storage volumes, moving the file to another one of the plurality of storage volumes with a storage classification that matches the access pattern of the file when available.

In another embodiment, a method for storing a file in a storage domain is provided. The method includes monitoring access to a file to determine a file access pattern, tagging the file to indicate the identified access pattern and using the tag to identify an appropriate storage medium in a storage domain for the file, when available, based on the access pattern.

In another embodiment, a data storage system with dynamic and transparent file migration is provided. The data storage system includes a plurality of storage volumes, each storage volume having an associated storage classification. The data storage system also includes a pattern recognition function that monitors access to files stored on the plurality of storage volumes to determine a pattern of access for each file. The data storage system further includes a look-up table associating the storage classification for each storage volume with at least one file access pattern and a file management function that periodically uses the access pattern of a file stored on the plurality of storage volumes to migrate the file from one storage volume to another storage volume in the plurality of storage volumes such that the storage classification of the storage volume matches the access pattern identified by the pattern recognition function for the file based on the look-up table.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention enable dynamic binding of files to appropriately matched storage volumes in a storage domain based on characteristics of the storage volumes and based on monitored patterns of access to the files. The term storage domain as used in this application means a group of storage devices such as storage volumes and storage arrays that are available to a file system. Advantageously, embodiments of the present invention enable improved file system performance without requiring manual, administrative actions to bind files with appropriate storage volumes, and without bringing the application offline or affecting system services.

Figure 1:
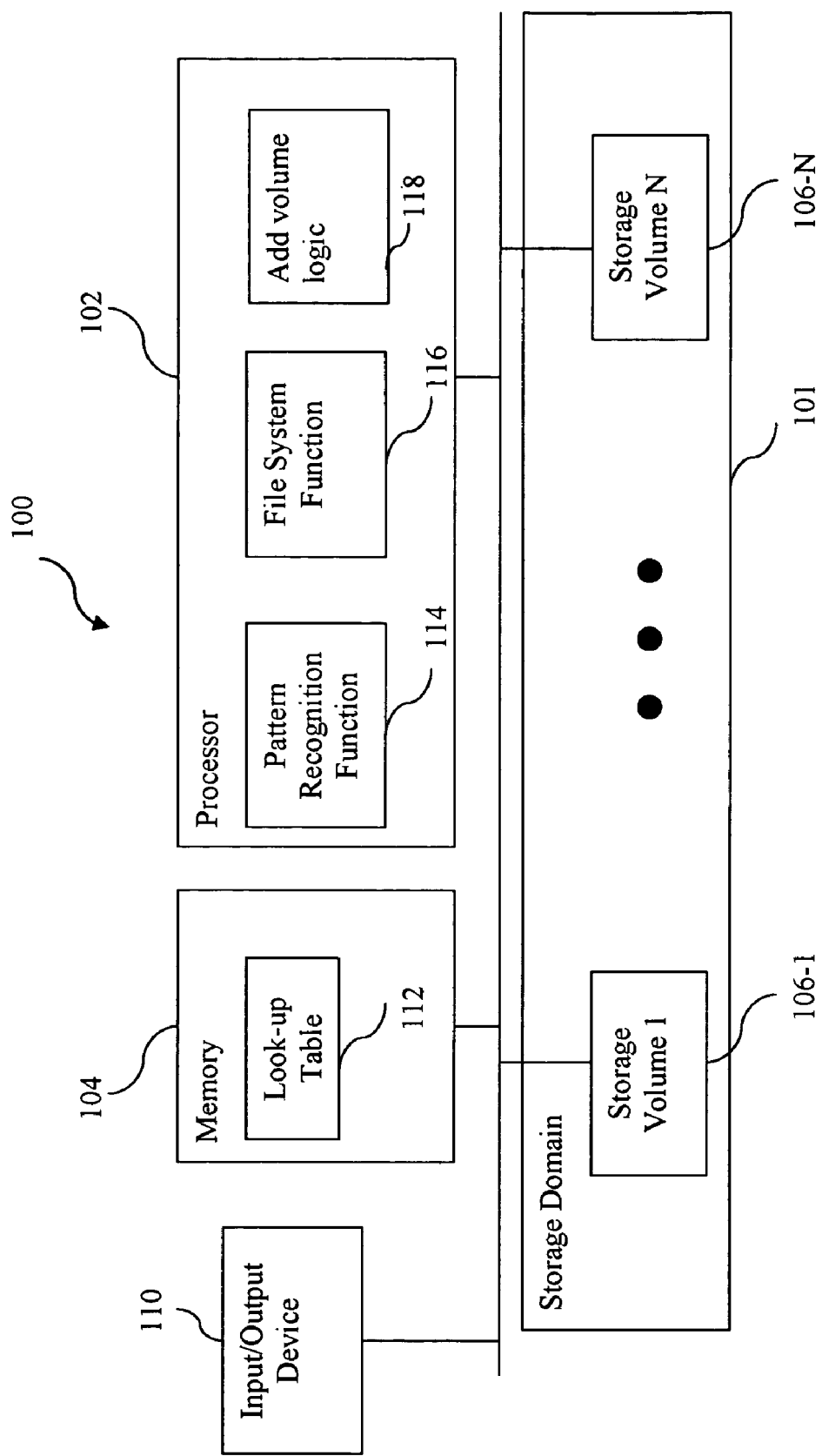
FIG. 1 is a block diagram of an embodiment of a system with dynamic binding of files with storage volumes in a storage domain.

FIG. 1 is a block diagram of an embodiment of a system, indicated generally at 100, that enables dynamic binding of files in a storage domain 101. System 100 includes a processor 102, memory 104, input/output device 110 and storage domain 101. Storage domain 101 includes a plurality of storage volumes 106-1 to 106-N. In one embodiment, storage domain 101 comprises a storage array. In other embodiments, storage domain 101 comprises any appropriate combination of storage volumes and storage arrays. The number and type of storage volumes 106-1 to 106-N in storage domain 101 are selected by a system administrator or designer based on the types of applications anticipated to be run on system 100. The teachings of the present invention are not limited to any particular number or types of storage volumes in storage domain 101. Rather, in one embodiment, system 100 includes at least two different types of storage volumes so that there is a choice of storage volumes for any given file stored in storage domain 101.

Processor 102 runs functions or programs that control the operation of system 100. In one embodiment, these functions are stored as program code in memory 104. In one aspect of its operation, processor 102 runs a file system function 116 to control, among other things, the binding of files to storage volumes 106-1 to 106-N in storage domain 101. File system function 116 assigns files to storage volumes based on two factors: pattern of access to the file and storage characteristics of the storage volumes 106-1 to 106-N.

Pattern recognition function 114 identifies access patterns for files stored in storage domain 101. In one embodiment, pattern recognition function 114 runs on processor 102. In other embodiments, pattern recognition function 114 runs on another processor. In further embodiments, pattern recognition function 114 is implemented in hardware, e.g., an application specific integrated circuit. Pattern recognition function 114 monitors access to the files stored in storage domain 101. In one embodiment, pattern recognition function 114 stores information on each access to each file stored in storage domain 101. For purposes of this specification, the term "access" means reading data from or writing data to a file. The information on access to the files is analyzed over time until a pattern emerges that is sufficiently strong to characterize an access pattern for a particular file. For example, in one embodiment, pattern recognition function 114 gathers data on each access such as the address of the read data, cache utilization, and inferences leading to the recognition of either sequenced or non-sequenced, e.g., random, file blocks or byte range access patterns requested by the application. From this data, pattern recognition function 114 determines whether the file access pattern matches a known pattern, e.g., random, sequential or some other identifiable access pattern. In one embodiment, pattern recognition function 114 continues to monitor the access information for the file even after an access pattern has been identified. Thus, if the access pattern for a file changes over time, pattern recognition function 114 will detect the change and provide this information for use by file system function 116.

File system function 116 determines the appropriate storage volume for a file based on this access pattern using data in memory 104. In one embodiment, memory 104 includes a look-up table 112 that provides a map between the types of access patterns and a variety of storage classifications. In one embodiment, the storage classifications comprise RAID properties, e.g., 0, 1, 0+1, 5, speed of the storage volume, cost of the storage volume, etc. and the access patterns comprise sequential, random, infrequent, and strided sequences of forwards and backwards, etc. It is understood that the storage classifications and access patterns identified here are provided by way of example and not by way of limitation. It is anticipated that the data in look-up table 112 will change over time as additional storage volumes, with possibly new capabilities and performance characteristics, are added to storage domain 101 and as new access patterns are identified. Further, when a new storage volume is added to storage domain 101, add volume logic 118 automatically updates the metadata associated with the storage volume when the storage volume is added to indicate the classification of the storage volume.

In one embodiment, file system function 116 performs a periodic check of the storage location of each file in storage domain 101. For example, file system function 116 checks the current access pattern for a file against the storage classification for its storage volume in storage domain 101 based on data in look-up table 112. If the storage classification does not match for the access pattern, the file system function 116 dynamically migrates the file to a storage volume that does match the access pattern. This migration is transparent to any applications using the file.

Figure 2:
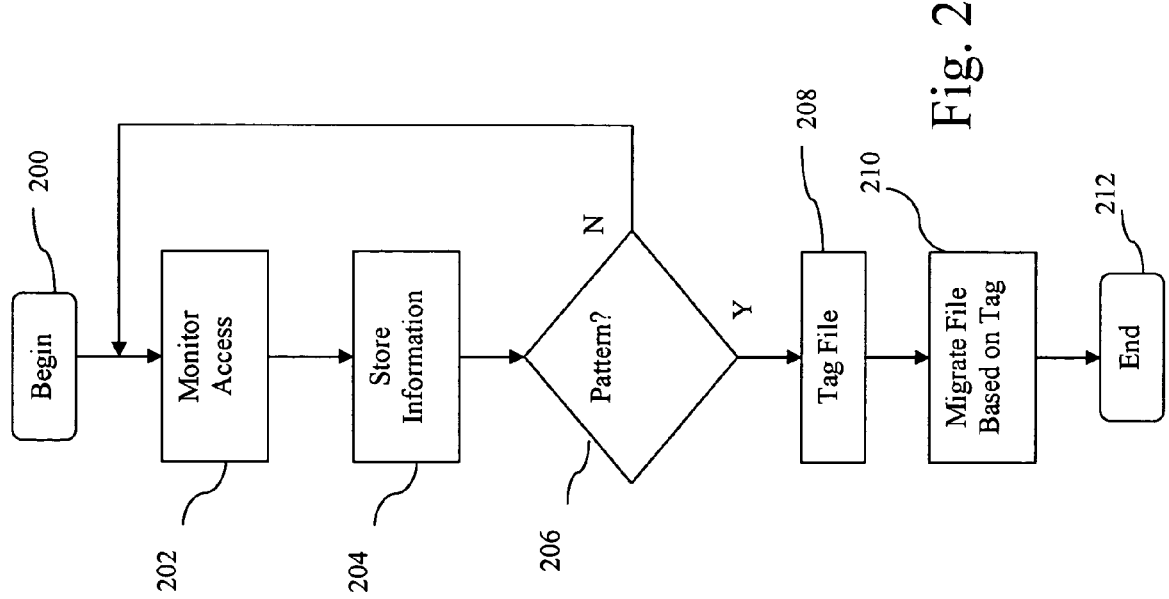
FIG. 2 is a flow chart of an embodiment of a process for matching the storage characteristics of a storage volume with an access pattern of a data file.

FIG. 2 is a flow chart of an embodiment of a process for matching the storage characteristics of a storage volume with an access pattern of a data file. The process begins at block 200. At block 202, the process monitors access to the file by an application. As discussed above, this access includes reading data from the file and writing data to the file by the application. On each access, the process stores information about the access at block 204. In one embodiment, this information includes the location of the data in the storage volume, the amount of data, the offset of the data within the file, etc. In one embodiment, the process monitors cached file metrics that reflect cache utilization. These metrics include recognition of efficient caching benefits including a read ahead metric that can be used to characterize the access patterns of an open file, e.g., sequential, random, etc. At block 206, the process analyzes the information gathered on accesses to the file to determine whether the access to the file matches any known pattern of access. In one embodiment, the process determines whether the access matches a known pattern at the time the file is closed. In one embodiment, this includes monitoring a weight factor that measures the relative strength of the match. If the process does not find a match to a known pattern, the process returns to block 202 and monitors for the next access to the file. In one embodiment, the process tags the file with an "undefined" access pattern.

If, at block 206, the process does identify a known pattern, the process tags the file at block 208. In one embodiment, the process tags the file when the file is closed. In one embodiment, the tag comprises a code that identifies the identified pattern. In one embodiment, the tag is added to metadata for the file. For example, if the process determines that the file is accessed in a sequential order, the process adds a code to the file to indicate a sequential access pattern. The process further uses this code at block 210 to assure that the file is stored on a storage volume that has storage characteristics that match the access pattern. The process ends at block 212.

Figure 3:
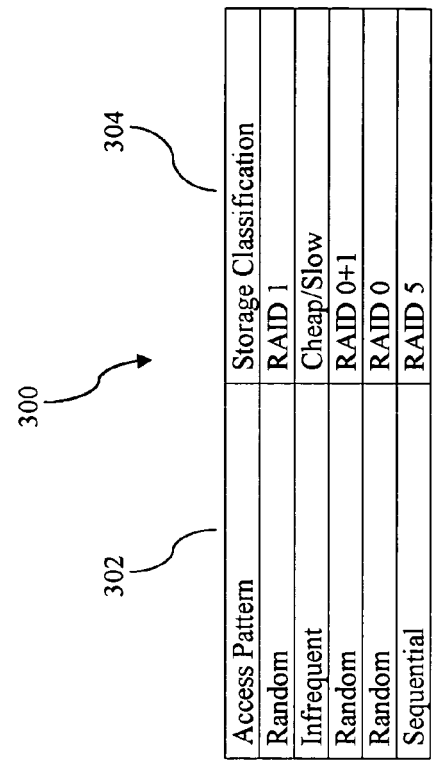
FIG. 3 is a table that illustrates one embodiment of a data structure used to associate the access pattern of a data file with a storage volume with appropriate storage characteristics.

FIG. 3 is a table that illustrates one embodiment of a data structure used to associate the access pattern of a data file with a storage volume with appropriate storage characteristics. In this embodiment, the data structure is a look-up table 300. Look-up table 300 includes two columns of data. Column 302 includes a list of known access patterns. In this example, the known access patterns include random, sequential and infrequent. In other embodiments, other identifiable access patterns are also supported. Column 304 provides the storage classifications for the storage volumes in a storage domain. In this example, the storage classifications include RAID properties, e.g., RAID 0, 1, 0+1, 5, etc. as well as other classifications such as "cheap/slow." It is understood that the data in this look-up table 300 is provided by way of example and not by way of limitation. Each row of the look-up table 300 defines an appropriate binding between an access pattern and a storage classification. In one embodiment, look-up table 300 is stored in memory 104 of FIG. 1 and used by file system function 116 to control the binding of files with appropriate storage volumes 106-1 to 106-N in storage domain 101.

Figure 4:
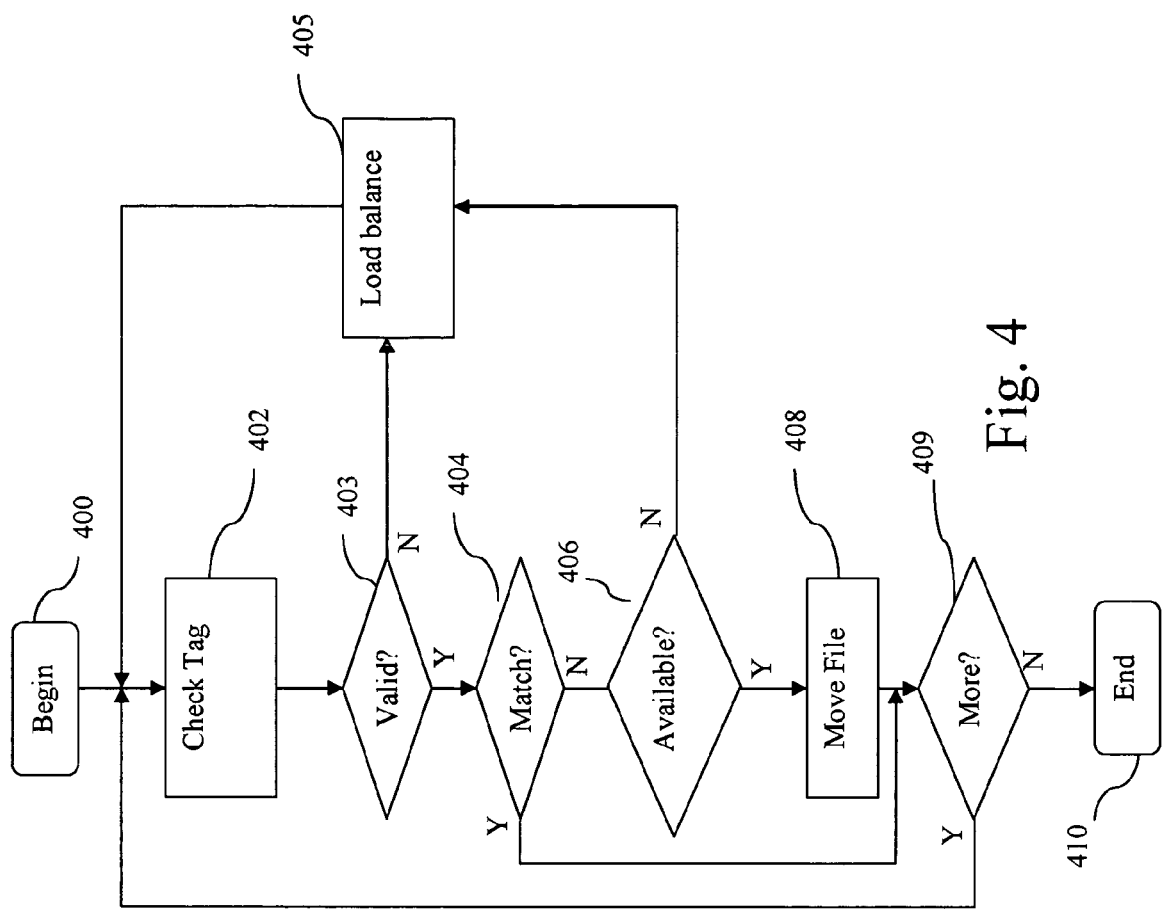
FIG. 4 is a flow chart of an embodiment of a process for migrating files amongst a plurality of storage volumes based on file access patterns and storage characteristics of the storage volumes.

FIG. 4 is a flow chart of an embodiment of a process for migrating files amongst a plurality of storage volumes in a storage domain based on file access patterns and storage characteristics of the storage volumes. In one embodiment, the process of FIG. 4 is executed on a periodic basis to assure that the files stored in the system are stored on appropriate storage volumes based on the access pattern to the file. In one embodiment, the process of FIG. 4 is one of a number of processes that are run on a periodic basis based on stored policies.

The process begins at 400. At block 402, the process checks a tag of a file, if available. In one embodiment, the tag identifies an access pattern for the file. In one embodiment, the tag is generated for the file based on a pattern recognition function that monitors access to the file over time. At block 403, the process determines whether an access pattern has been identified by checking if the tag is a valid tag. If the file does not have a valid tag, the process performs load balancing of the file with other untagged files at block 405. For purposes of this specification, the term load balancing means evenly distributing files among all the appropriate, available storage volumes.

At block 404, the process determines whether the tag is consistent with a storage classification for the storage volume on which the file resides. In one embodiment, the process determines whether the tag is consistent with the storage classification for the storage volume based on a look-up table of the type illustrated in FIG. 3. If the tag is not consistent with the storage classification, then the process determines at block 406 whether a storage volume with a storage classification that matches the tag is available in the storage domain. If not, the process returns to block 405 and includes the file in load balancing with the untagged files. If a storage volume is available that matches the storage classification associated with the tag, the file is dynamically and transparently migrated to the storage volume at block 408. In one embodiment, the file is migrated by identifying a storage volume with a storage classification that matches the file access pattern, deleting the file from the current storage volume and saving the file on the identified storage volume. It is noted that the deletion and saving of the file is done transactionally so that either both operations are done or neither is done. Otherwise, if, at block 404, the tag is consistent with the storage classification, the process skips blocks 406 and 408 and moves on to block 409. At block 409, the process determines whether there are more files to be processed. If so, the process returns to block 402 and verifies appropriate binding of files and storage volumes based on storage classifications and file access patterns. If there are no more file to be processed in this pass, the process ends at block 410.

As discussed above, if a file is tagged, but, at block 406 it is determined that there is no storage volume with an appropriate storage classification available, the file is not moved. However, the process of FIG. 4 is repeated with sufficient frequency to enable tagged files to be dynamically migrated once an appropriate storage volume is added to the storage domain. Thus, after a storage domain with the appropriate characteristic is added to the storage domain, the process will again attempt to locate a matching storage volume and dynamically migrate the file to the volume upon finding such a match.

Those skilled in the art will recognize that the techniques and methods described here are implemented, in some embodiment, by programming a programmable processor with appropriate instructions to implement the functionality described here. In such embodiments, such program instructions are stored in a suitable memory device (for example, read-only memory and/or random-access memory) from which the program instructions are retrieved during execution. Also, suitable data structures are stored in memory in such embodiments.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for dynamically migrating files in a storage domain transparent to any applications currently using the file, the method comprising:
   periodically checking a tag in a file stored on one of a plurality of storage volumes in the storage domain, wherein the tag identifies a pattern of prior access to the file;
   determining whether the access pattern matches a storage classification for the one of the plurality of storage volumes on which the file is stored; and
   when the access pattern does not match the storage classification for the one of the plurality of storage volumes on which the file is stored, moving the file to another one of the plurality of storage volumes with a storage classification that matches the access pattern of the file when available.

2. The method of claim 1, and further comprising:
maintaining the tag with the file until a storage volume is added to the storage domain with a storage classification that matches the file access pattern; and
migrating the file to the matched storage volume.

3. The method of claim 1, and further determining whether a pattern of access has been identified for the file.

4. The method of claim 3, wherein determining whether the pattern of access has been identified comprises determining whether the file has a valid tag.

5. The method of claim 1, and further comprising periodically balancing the load of files across the storage domain for files without a tag.

6. The method of claim 5, and wherein periodically balancing the load of files includes balancing the load of files that have a tag but do not have a matching storage volume.

7. The method of claim 1, wherein determining whether the access pattern matches the storage classification for the one of the plurality of storage volumes comprises consulting a look-up table.

8. The method of claim 1, wherein moving the file to another one of the plurality of storage volumes comprises:
identifying a storage volume with a storage classification that is appropriate to the access pattern for the file;
deleting the file from the one of the plurality of storage volumes;
saving the file to the another one of the plurality of storage volumes with the storage classification that matches the access pattern for the file; and
wherein deleting and saving the file are done transactionally to prevent loss of data.

9. The method of claim 8, wherein if a storage volume with a storage classification that is appropriate to the access pattern for the file is not identified, the method further comprises:
maintaining the tag with the file until a storage volume is added to the storage domain with a storage classification that matches the file access pattern; and
migrating the file to the matched storage volume.

10. A computer readable medium having a data structure stored thereon, the data structure comprising:
a plurality of types of storage volumes, each type of storage volume having an associated storage classification based on functional properties of the storage volume;
a plurality of file access patterns; and
wherein each of the plurality of file access patterns is associated with at least one of the plurality of types of storage volumes to enable moving a file to an appropriate storage volume when a current file access pattern does not match the associated storage classification for the type of storage volume on which the file is stored, wherein the moving of the file is based on the current access pattern associated with the file by a tag stored in the file.

11. The computer readable medium of claim 10, wherein the data structure comprises a table that cross references the plurality of types of storage devices with the plurality of file access patterns.

12. A method for storing a file in a storage domain, the method comprising:
monitoring access to a file to determine a file access pattern;
tagging the file to indicate the identified access pattern; and
using the tag to identify an appropriate storage medium in a storage domain for the file, when available, wherein each storage volume is associated with a storage classification based on functional properties of the storage volume, and wherein the appropriate storage medium is the storage medium having the associated storage classification that matches the identified access pattern.

13. The method of claim 12, and further comprising:
if the appropriate storage medium is not available in the storage domain when the file access pattern is determined, maintaining the tag with the file until a storage volume is added to the storage domain with an associated storage classification that matches the file access pattern; and
migrating the file to the matched storage volume.

14. The method of claim 12, wherein tagging the file comprises tagging the file when an access pattern is determined at a time the file is closed.

15. The method of claim 12, wherein monitoring access to the file comprises recording information each time data is read from or written to the file.

16. The method of claim 12, wherein using the tag to identify an appropriate storage medium comprises periodically comparing the pattern of usage for the file with the storage classification associated with the storage volume for the file based on the tag of the file.

17. A method for matching a file with a storage volume in an array of a plurality of storage volumes, the method comprising:
storing information on each access to a file;
monitoring the information on each access to the file over time to determine an access pattern;
when a pattern emerges from the information, selecting a tag that identifies the access pattern;
tagging the file with the selected tag; and
when the access pattern does not match the storage classification for the one of the plurality of storage volumes on which the file is stored, migrating the file to a storage volume that matches the characteristics of the identified access pattern wherein each storage volume includes a storage classification based on functional properties of the storage volume.

18. The method of claim 17, wherein storing information on each access comprises storing information each time data is written to the file and each time data is read from the file.

19. The method of claim 17, wherein monitoring the information on each access comprises determining a value that represents the strength of the pattern.

20. The method of claim 17, wherein migrating the file comprises moving the file to a storage volume that has an associated storage classification that matches the identified access pattern.

21. A data storage system with dynamic and transparent file migration, the data storage system comprising:
a plurality of storage volumes, each of the storage volumes having an associated storage classification based on functional properties of the storage volumes;
a pattern recognition function that monitors access to files stored on the plurality of storage volumes to determine a pattern of access for each of the files;
a look-up table associating the storage classification for each of the storage volumes with at least one of the file access patterns; and
a file management function that periodically uses a tag in one of the files that indicates the access pattern of the file stored on the plurality of storage volumes, wherein if the indicated access pattern does not match the storage classification for the one of the plurality of storage volumes on which the file is currently stored, the file management function migrates the file from one of the storage volumes to another of the storage volumes such that the storage classification associated with the storage volume matches the access pattern identified by the pattern recognition function for the file, wherein the migration is based on the look-up table.

22. The system of claim 21, wherein the plurality of storage volumes comprises at least two different types of storage volumes.

23. The system of claim 21, wherein the file management function tags the files with a tag that represents the file access pattern based on the pattern recognition function.

24. The system of claim 21, and further including an input/output device that is adapted to receive the storage classification for a storage device when it is added to the plurality of storage devices.

25. A machine readable medium comprising instructions stored thereon for implementing a method for matching a file with a storage volume in an array of a plurality of storage volumes, the method comprising:

storing information on each access to a file;

monitoring the information on each access to the file over time to determine an access pattern;

when a pattern emerges from the information, selecting a tag that identifies the access pattern;

tagging the file with the selected tag; and when the access pattern does not match the associated storage classification of the storage volume currently storing the file, migrating the file to a storage volume having an associated storage classification that matches the characteristics of the identified access pattern, when available, without any interruption of access to the file by applications.

26. The machine readable medium of claim 25, wherein storing information on each access comprises storing information each time data is written to the file and each time data is read from the file.

27. The machine readable medium of claim 25, wherein monitoring the information on each access comprises determining a value that represents the strength of the pattern.

* * * * *

UNITED STATES PATENT AND TRADEMARK OFFICE
CERTIFICATE OF CORRECTION

| | | |
|---|---|---|
| PATENT NO. | : 7,533,230 B2 | |
| APPLICATION NO. | : 10/964835 | |
| DATED | : May 12, 2009 | |
| INVENTOR(S) | : Frederick S. Glover et al. | |

It is certified that error appears in the above-identified patent and that said Letters Patent is hereby corrected as shown below:

On the title page, in item (73), in "Assignee", delete "Developmetn" and insert -- Development --, therefor.

Signed and Sealed this

Fifteenth Day of September, 2009

David J. Kappos
*Director of the United States Patent and Trademark Office*